United States Patent
Chao (10) Patent No.: US 7,760,175 B2
(45) Date of Patent: Jul. 20, 2010

(54) MULTI-LIGHT DRIVING DEVICE, LCD WITH MULTI-LIGHT DRIVING DEVICE AND METHOD FOR DRIVING LCD

(75) Inventor: Yuan-Jen Chao, Kaohsiung (TW)

(73) Assignee: Gigno Technology Co., Ltd., Taipei, Taiwan (CN)

( * ) Notice: Subject to any disclaimer, the term of this patent is extended or adjusted under 35 U.S.C. 154(b) by 877 days.

(21) Appl. No.: 11/640,883

(22) Filed: Dec. 19, 2006

(65) Prior Publication Data

US 2007/0097070 A1 May 3, 2007

Related U.S. Application Data

(62) Division of application No. 10/715,475, filed on Nov. 19, 2003, now Pat. No. 7,218,307.

(30) Foreign Application Priority Data

Nov. 20, 2002 (TW) ............................. 91218715 U
Jan. 28, 2003 (TW) ............................. 92101899 A (51) Int. Cl.
G09G 3/36 (2006.01)
(52) U.S. Cl. ............................ 345/87; 345/82; 345/98
(58) Field of Classification Search ........... 345/87–100, 345/102, 82, 83; 315/208 PZ, 224, 307, 127, 315/209 PZ, 291
See application file for complete search history.

(56) References Cited

U.S. PATENT DOCUMENTS

| 5,818,172 | A | * | 10/1998 | Lee .............................. 315/86 |
| 5,854,617 | A | * | 12/1998 | Lee et al. ..................... 345/102 |
| 6,118,221 | A | * | 9/2000 | Kumasaka et al. ..... 315/209 PZ |
| 6,239,558 | B1 | * | 5/2001 | Fujimura et al. ............ 315/307 |
| 2002/0036608 | A1 | * | 3/2002 | Hirakata et al. ............... 345/87 |

\* cited by examiner

*Primary Examiner*—Kimnhung Nguyen
(74) *Attorney, Agent, or Firm*—Birch, Stewart, Kolasch & Birch, LLP (57) ABSTRACT

A method for driving an LCD includes a first brightness adjusting step and a second brightness adjusting step. In the first brightness adjusting step, the relative brightness of a plurality of light-emitting units is adjusted, so that the screen of the LCD presents a dark zone. The dark zone is caused by the brightness distribution of the light-emitting units and includes a scan line being activated. In the second brightness adjusting step, the relative brightness of the light-emitting units is readjusted after a specific scan timing. Therefore, the dark zone is shifted such that another scan line, which is being activated, is located in the shifted dark zone. Furthermore, a multi-light driving device and an LCD with the multi-light driving device and driven by the method are disclosed.

6 Claims, 6 Drawing Sheets

MULTI-LIGHT DRIVING DEVICE, LCD WITH MULTI-LIGHT DRIVING DEVICE AND METHOD FOR DRIVING LCD

This application is a Divisional of co-pending application Ser. No. 10/715,475 filed on Nov. 19, 2003 now U.S. Pat. No. 7,218,307, and for which priority is claimed under 35 U.S.C. §120; and this application claims priority of Application No(s). 091218715 and 092101899 filed in Taiwan on Nov. 20, 2002 and Jan. 28, 2003, under 35 U.S.C. §119; the entire contents of all are hereby incorporated by reference.

INVENTION

The invention relates to a multi-light driving device, an LCD and a method for driving the LCD and, in particular, to a multi-light driving device, an LCD and a method for driving the LCD, which generate a dark zone that is shifted in sequence on a screen of the LCD.

RELATED ART

Liquid crystal displays (LCDs) are widely spread in electrical products such as computers. Accompanying the developing of LCD technology, the qualities of LCDs are improved and the screen sizes of LCDs are increased. Thus, the LCD is suitable for a TV display, which usually plays moving picture images. The LCD, however, has poor response time for the moving picture images, and, to make it worse, human eyes have the persistence of vision. Therefore, some problems, such as image blurring, exist when using an LCD for the TV display. Thus, the LCD is inferior to the conventional TV displays, which do not have the above-mentioned problem, and has limited applications for serving as a TV display.

The conventional TV displays usually employ a cathode ray tube (CRT). Since the CRT utilizes impulse-type display method to show images, the above-mentioned image blurring issue caused by persistence of vision will not occur. In contrary, the conventional LCD utilizes hold-type display method to show images, such that when showing moving picture images, the image blurring caused by the persistence of vision will easily occur in the screen of the LCD.

Recently, a blink technology is disclosed to solve the image blurring issue. The blink technology performs on/off switching of the entire light-emitting units of the backlight module of an LCD, so that the backlight module can create blinking effect. Thus, the backlight module of the LCD can simulate the impulse-type display for eliminating the image blurring issue. Regarding the blink technology, since the light-emitting units perform on/off switching all the time, the brightness changing of the LCD screen is huge. This may result in flicker issue of vision. In addition, when the light-emitting units perform on/off switching all the time, the effective brightness of the whole screen is decreased and the quality of the display suffers. Moreover, when the light-emitting unit is turned on after just being turned off, the current of the light-emitting unit, which is typically a lamp, is fast changing and will pass through a transient period. When the current of the lamp passes through the transient, the current and the brightness of the lamp may not be accurately controlled, and thus the brightness uniformity between the lamps may not be easily maintained.

As mentioned above, it is an important subjective to provide an LCD and a method for driving the LCD, which can maintain the brightness of the LCD, eliminate the image blurring, and prevent the flicker issue. Furthermore, it is an addition important subjective to provide a multi-light driving device, which can maintain the brightness of an LCD, eliminate the image blurring, and prevent the flicker issue.

SUMMARY OF THE INVENTION

In view of the above-mentioned problems, an objective of the invention is to provide an LCD and a method for driving the same, which can eliminate the image blurring, prevent the flicker issue, and have satisfactory brightness of the LCD.

It is another objective of the invention to provide a multi-light driving satisfactory brightness of the LCD.

To achieve the above-mentioned objective, a method for driving an LCD includes a first brightness adjusting step and a second brightness adjusting step. In the first brightness adjusting step, the relative brightness between a plurality of light-emitting units is adjusted, so that the screen of the LCD panel presents a dark zone caused by the brightness distribution of the light-emitting units. The dark zone includes one of the scan lines, which is being activated. In the second brightness adjusting step, the relative brightness of the light-emitting units is readjusted after a specific scan timing, so that the dark zone is shifted and includes another one of the scan lines, which is being activated after the specific scan timing.

Furthermore, the invention discloses an LCD, which includes a panel, a displaying system circuit, a backlight module, and a multi-light driving device. The panel includes a plurality of scan lines, and the displaying system circuit electrically connects to and controls the panel, and generates a system timing signal. The backlight module is positioned behind the panel and has a plurality of light-emitting units. The multi-light driving device electrically connects to the backlight module and generates a plurality of driving signals. The driving signals are used to drive the light-emitting units respectively. The multi-light driving device adjusts the current levels of the driving signals in sequence according to the system timing signal, so as to change the brightness of the light-emitting units in sequence. Thus, the screen of the panel presents a dark zone caused by the brightness distribution of the light-emitting units and including one of the scan lines, which is being activated.

The LCD and the method for driving the same of the invention generate a dark zone to include a scan line being activated, which can simulate the impulse-type display and prevent the image blurring issue caused by the persistence of vision of human eyes. Furthermore, the LCD and the method for driving the same of the invention generate a dark zone having non-zero brightness, so that the brightness of the LCD screen would not be over decreased. In addition, since the dark zone has non-zero brightness, the brightness changing of the screen can be controlled within a proper range. Thus, the flicker issue can be prevented.

The invention also discloses a multi-light driving device, which includes a plurality of oscillation step-up circuits and a digital control circuit. Each oscillation step-up circuit generates an AC signal and electrically connects to the digital control circuit. The digital control circuit generates sets of digital switching signals ($P_ia$ and $P_{ib}$), which are phase controllable and duty cycle controllable. The phases and duty cycles of the sets of digital switching signals ($P_ia$ and $P_{ib}$) are controlled by the digital control circuit. The current level of the AC signal generated by each oscillation step-up circuit is adjusted according to the corresponding set of the digital switching signals ($P_ia$ and $P_{ib}$).

Since the multi-light driving device of the invention generates sets of digital switching signals using a digital-control method, which are phase controllable and duty cycle controllable, the relative brightness between a plurality of light-emitting units can be easily adjusted. Thus, a dark zone can be generated in the screen of the LCD by the brightness distribution of the light-emitting units. In other words, the multi-light driving device of the invention can generate a dark zone that includes a scan line, which is being activated. This can simulate the impulse-type display. Therefore, the image blurring issue existing in the conventional LCD can be prevented. Furthermore, since the brightness changing of the light-emitting units is controlled within a proper range when driven by the multi-light driving device, the flicker issue can be prevented.

BRIEF DESCRIPTION OF THE DRAWINGS

The invention will become more fully understood from the detailed description given herein below illustrations only, and thus is not limitative of the present invention, and wherein.

DETAILED DESCRIPTION OF THE INVENTION

The method for driving an LCD according to the preferred embodiment of the invention will be described herein below with reference to the accompanying drawings. In the embodiment, the LCD includes a backlight module, a panel, and a multi-light driving device. The backlight includes a plurality of light-emitting units, each of which includes one or more lamps. The lamp can be a cold cathode fluorescent lamp (CCFL). The panel has a plurality of scan lines, and the LCD of the invention is a TFT-LCD with the backlight module being a direct back-light.

Figure 1:
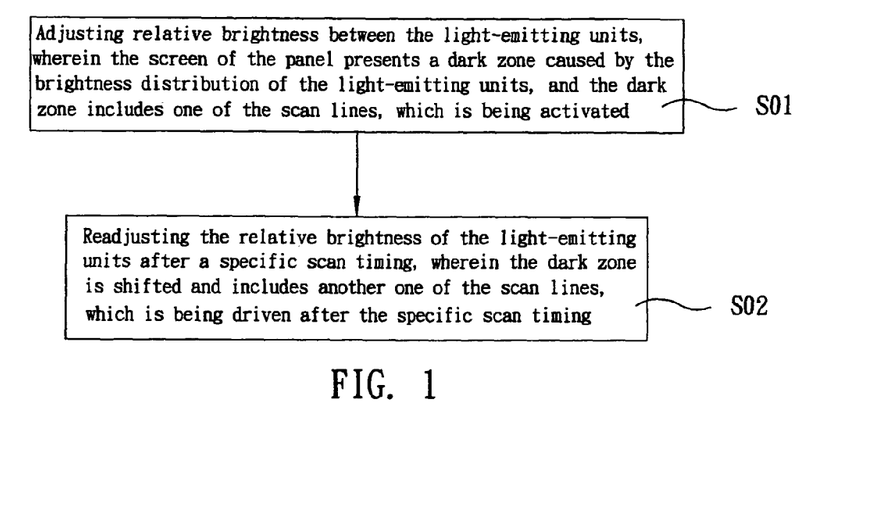
FIG. 1 is a block diagram showing a method for driving an LCD according to a preferred embodiment of the invention.

With reference to FIG. 1, the method for driving an LCD includes a first brightness adjusting step S01 and a second brightness adjusting step S02.

In the first brightness adjusting step S01, the relative brightness between the light-emitting units is adjusted by the multi-light driving device. Thus, the screen of the panel presents a dark zone caused by the brightness distribution of the light-emitting units, and the dark zone includes one of the scan lines, which is being activated. In this step S01, the brightness of at least one of the light-emitting units is decreased. The brightness of the light-emitting unit with decreased brightness is decreased to between 0 and 90% of the original brightness of the light-emitting unit, or to between 0 and 90% of the brightness of an adjacent light-emitting unit. The brightness of the light-emitting unit can be decreased in a continuous way or a step-by-step way. It is proper that the decreased brightness of the dark zone corresponding to the light-emitting unit is larger than 10% of that of the region outside the dark zone.

In the second brightness adjusting step S02, the relative brightness of the light-emitting units is readjusted after a specific scan timing. Therefore, the dark zone is shifted and includes another one of the scan lines, which is being activated after the specific scan timing. The specific scan timing is, for example, the timing needed for driving a plurality of scan lines in sequence. The brightness of the light-emitting unit having decreased brightness in the step S01 is increased back to that of the original brightness of the light-emitting unit in the second brightness adjusting step S02, and the brightness of another one of the light-emitting units is decreased to cause the shifting of the dark zone. In this embodiment, the direction of the dark zone moving is the same as that of the scan line scanning. In addition, the brightness of this light-emitting unit is decreased to between 0 and 90% of its original brightness, or to between 0 and 90% of the brightness of an adjacent light-emitting unit. It is preferred that the decreased brightness of the dark zone corresponding to this light-emitting unit is larger than 10% of that of the region outside the dark zone. The brightness of the light-emitting unit can be decreased in a continuous way or a step-by-step way.

It should be noted that when the LCD is powered on, the second brightness adjusting step S02 is repeatedly performed. Thus, the dark zone keeps shifting to ensure that a scan line being activated is located in the dark zone.

Figure 2:
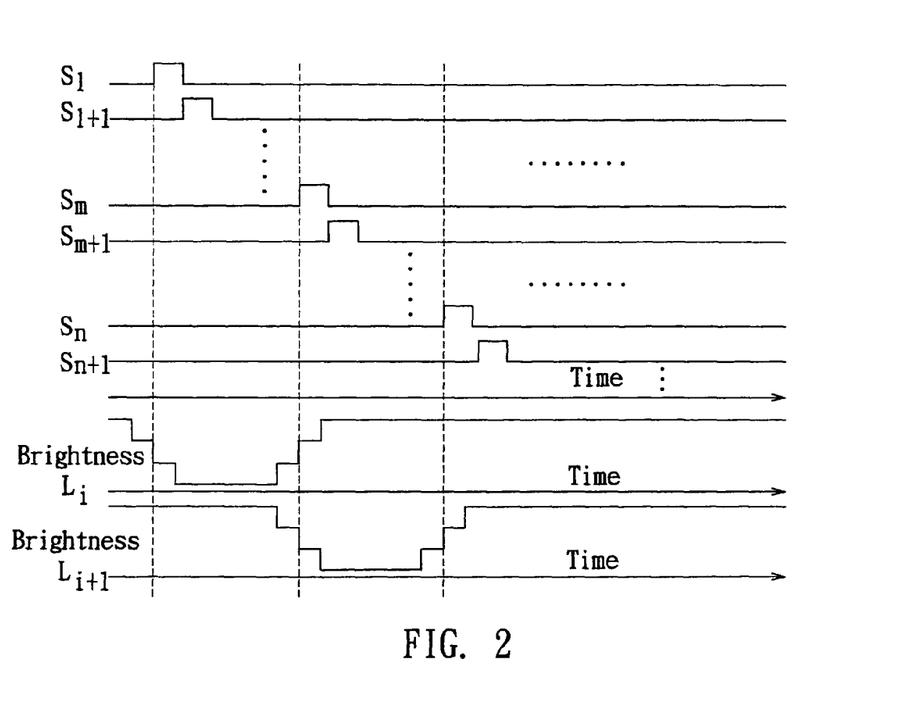
FIG. 2 is a schematic illustration showing the relationship between the timings for driving the scan lines of an LCD of the invention and the brightness of the light-emitting unit.
Figure 3:
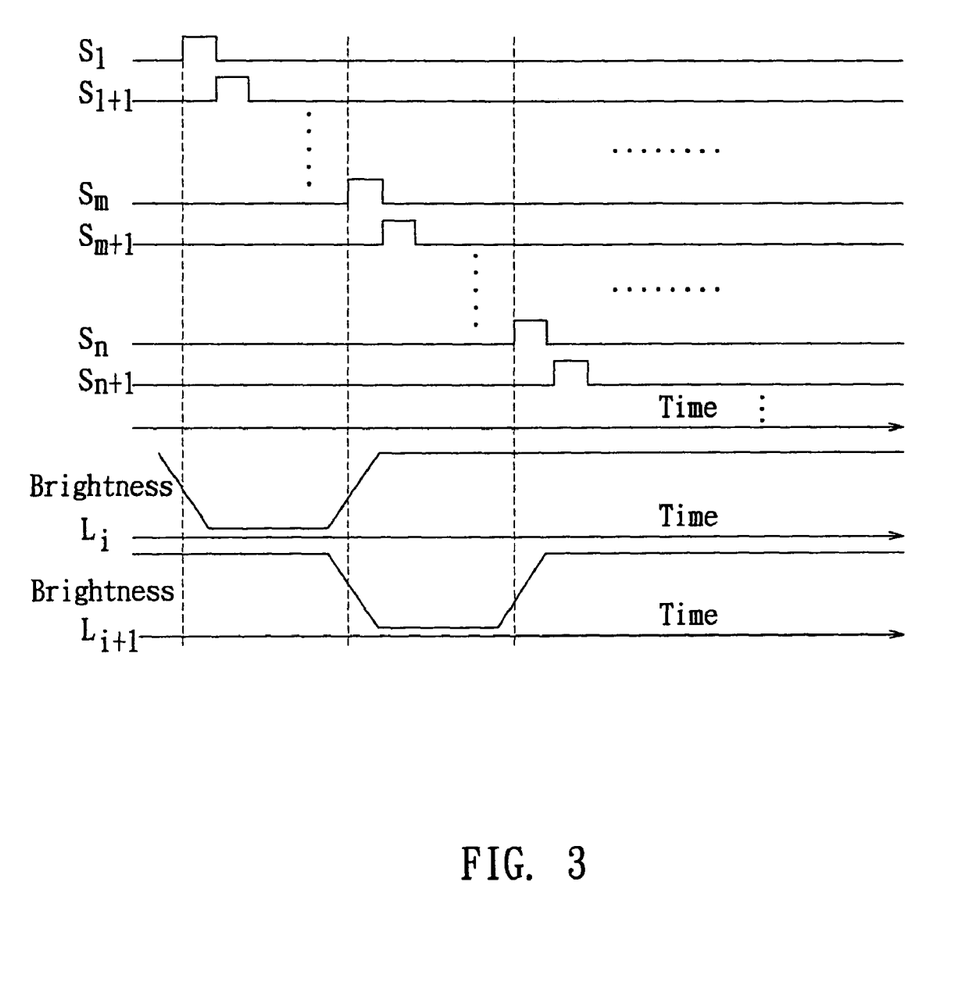
FIG. 3 is a schematic illustration showing another relationship between the timings for driving the scan lines of an LCD of the invention and the brightness of the light-emitting unit.

The method for driving an LCD of the invention is further described with reference to FIG. 2 and FIG. 3. In FIG. 2 and FIG. 3, the symbols $S_i$ to $S_{n+1}$ represent part of the scan lines of the panel of the LCD, and the symbols $L_i$ and $L_i+1$ represent two adjacent light-emitting units.

FIG. 2 is a schematic illustration showing the brightness of the light-emitting unit, which is decreased in a step-by-step way. FIG. 3 is another schematic illustration showing the brightness of the light-emitting unit, which is decreased in a continuous way. Referring to FIG. 2 and FIG. 3, before the scan line $S_I$ is activated, the brightness of the light-emitting unit $L_i$ starts decreasing. The brightness of the light-emitting unit $L_i$ reaches the lowest level before the scan line $S_{ki+n,y_2}$ is activated. Then, the brightness of the light-emitting unit $L_i$ starts increasing before the scan line $S_R$, is activated. The second brightness adjusting step S02 begins at this moment. While the brightness of the light-emitting unit $L_i$ starts increasing, the brightness of the light-emitting unit $L_i+1$ starts decreasing. Thus, the brightness of the light-emitting unit $L_i+1$ starts decreasing before the scan line $S_R$, is activated. At the meanwhile, the dark "zone of the screen of the LCD is shifted. It should be noted that the specific scan timing is, for example, the timing from the scan line $S_i$ being activated to the scan line $S_{i+q}$ being activated (1+q $\leq$ m, q>0).

As mentioned above, the method for driving an LCD of the invention generates a dark zone when the scan lines are activated sequentially, and the dark zone includes the scan line that is being activated. This can simulate the impulse-type display. Thus, the image blurring issue of the LCD can be prevented. Furthermore, since the method for driving an LCD of the invention generates the dark zone having non-zero brightness, the brightness of the LCD screen would not be over decreased. Moreover, since the dark zone has non-zero brightness in the invention, the brightness changing can be controlled within a proper range. Thus, the flicker issue can be prevented.

An LCD according to a preferred embodiment of the invention will be described with reference to FIG. 4 to FIG. 8.

Figure 4:
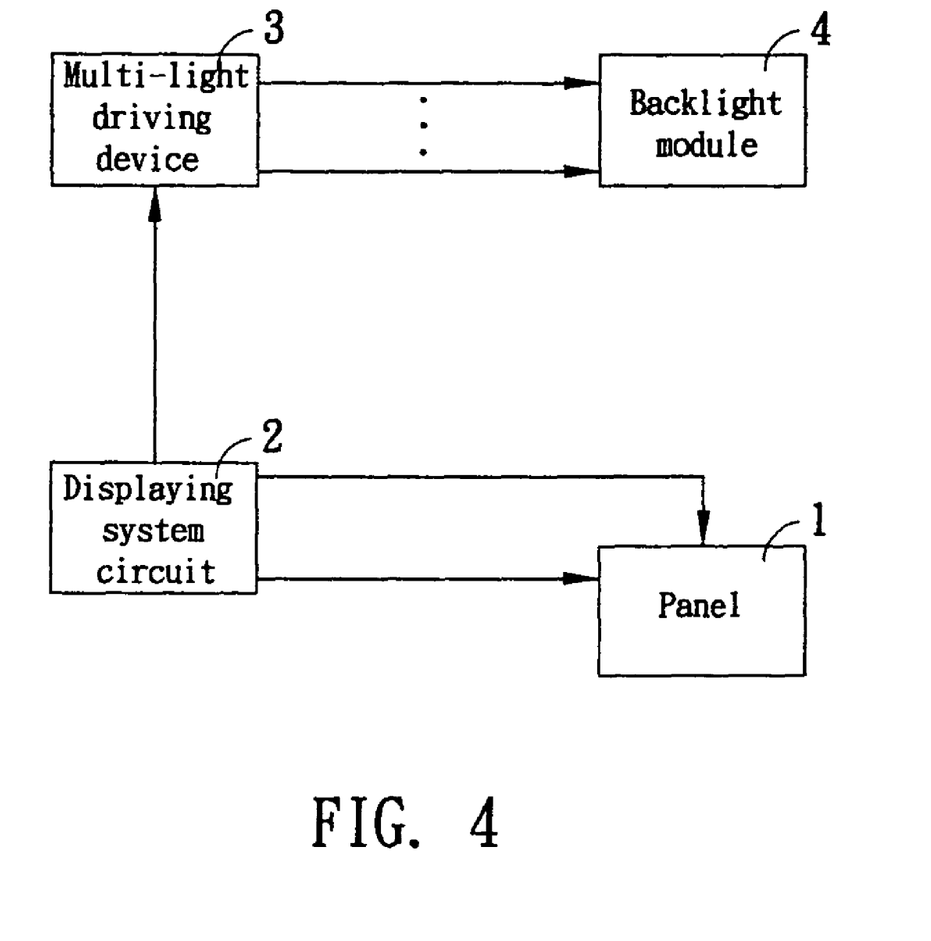
FIG. 4 is a block diagram showing an LCD of the invention.

Referring to FIG. 4, the LCD of the invention includes a panel 1, a displaying system circuit 2, a multi-light driving device 3, and a backlight module 4.

Figure 5:
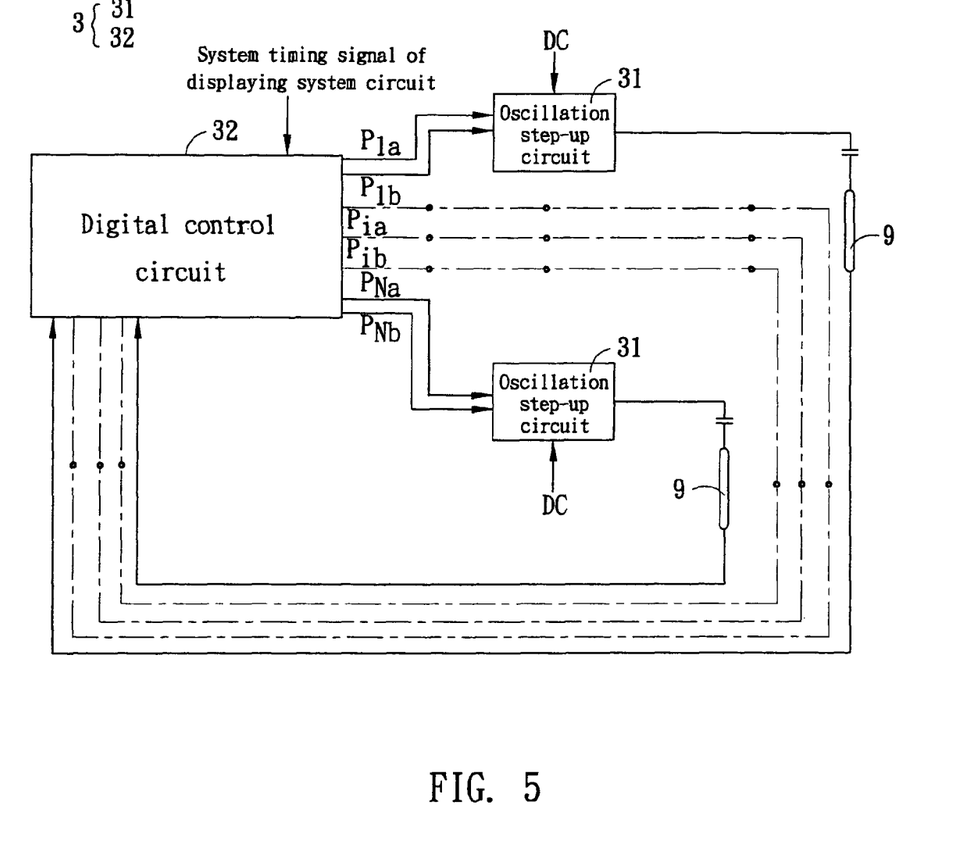
FIG. 5 is a block diagram showing a multi-light driving device of the LCD according to a preferred embodiment of the invention.

The panel 1 includes a plurality of scan lines. In this embodiment, the panel 1 further includes a data line driving circuit and a scan line driving circuit (not shown). The displaying system circuit 2 electrically connects to the panel 1 to control the panel 1, and generates a system timing signal to the multi-light driving device 3. The backlight module 4 is positioned behind the panel 1 and has a plurality of light-emitting units. With reference to FIG. 5, the CCFL 9 is equivalent to the above-mentioned light-emitting unit. In this case, as shown in FIG. 5, a light-emitting unit is consisting of one lamp.

The multi-light driving device 3 electrically connects to the backlight module 4 and generates a plurality of driving signals. The driving signals drive the light-emitting units (the CCFLs 9), respectively. The multi-light driving device 3 adjusts the current levels of the driving signals in sequence according to the system timing signal of the display system circuit 2 to change the brightness of the light-emitting units in sequence. Thus, the screen of the panel 1 presents a dark zone caused by the brightness distribution of the light-emitting units, and the dark zone includes one of the scan lines, which is being activated. Furthermore, with reference to FIG. 5, the multi-light driving device 3 of the invention includes a plurality of oscillation step-up circuits 31 and a digital control circuit 32.

Each of the oscillation step-up circuit 31 generates an AC signal, and electrically connects to one of the light-emitting units of the backlight module 4. The AC signal is used to drive one of the light-emitting units and to control the brightness of the light-emitting unit.

Figure 6:
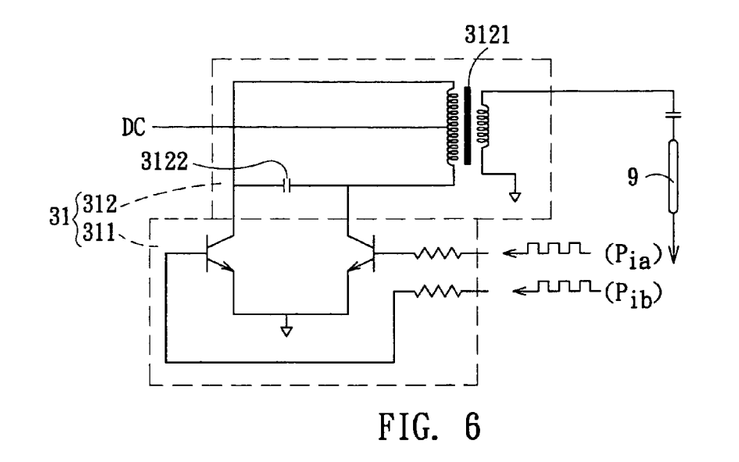
FIG. 6 is a schematic illustration showing an oscillation step-up circuit of the multi-light driving device of the LCD of the invention.

The digital control circuit 32 respectively connects to the oscillation step-up circuits 31, and generates sets of digital switching signals ($P_ia$ and $P_{ib}$), which are phase controllable and duty cycle controllable. The sets of digital switching signals are respectively transmitted to the oscillation step-up circuits 31 (as shown in FIG. 6). The phase and a duty cycle of each set of the digital switching signals (Pia and P;b) are controlled by the digital control circuit 32. With reference to FIG. 5, the digital control circuit 32 outputs N sets of digital switching signals (from $P_{ia}$ and $_{Pib}$ $^{to}$ Pna and $P_{Nb}$). The digital control circuit 32 adjusts the duty cycle of each set of digital switching signals (Pia and $P_{ib}$) according to the system timing signal output from the displaying system circuit 2.

With reference to FIG. 6, each oscillation step-up circuit 31 includes a switching unit 311 and a resonance step-up unit 312. In this embodiment, the switching unit 311 includes two bipolar transistors and two resistors. The base electrodes of the transistors electrically connect to the resistors, respectively, and the resistors further connect to the digital control circuit 32. The resonance step-up unit 312 is mainly composed of a transformer 3121 and a capacitor 3122, wherein the two ends of the capacitor 3122 are connected to the collectors of the transistors of the switching unit 311. The resonance step-up unit 312 may further connect to a CCFL 9 (the light-emitting unit). The switching unit 311 may consist of only two MOS transistors (not shown). In such a case, the digital control circuit 32 outputs the digital switching signals ($P_ia$ and $P_{ib}$) to control the gates of the MOS transistors.

Figure 7A:
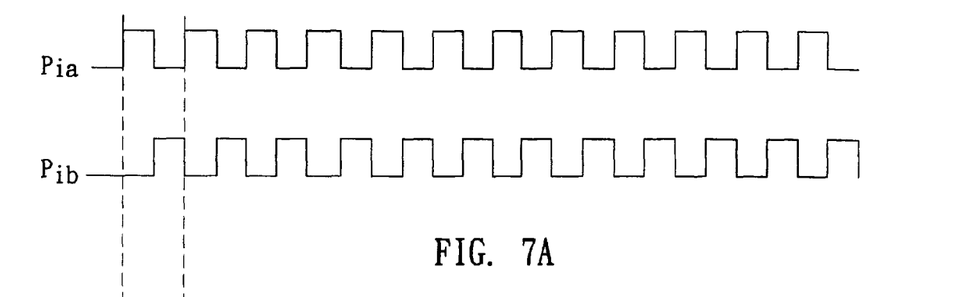
FIGS. 7A and 7B are timing charts showing the timings of the digital switching signals generated by the digital control circuit of the multi-light driving device of the LCD of the invention.
Figure 7B:
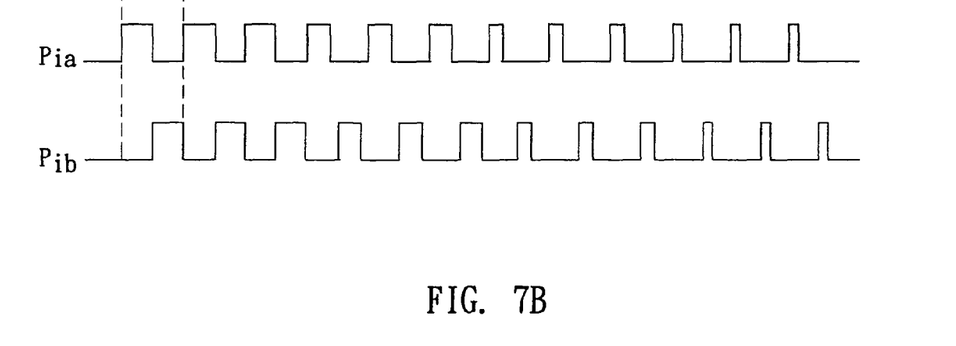
Figure 8:
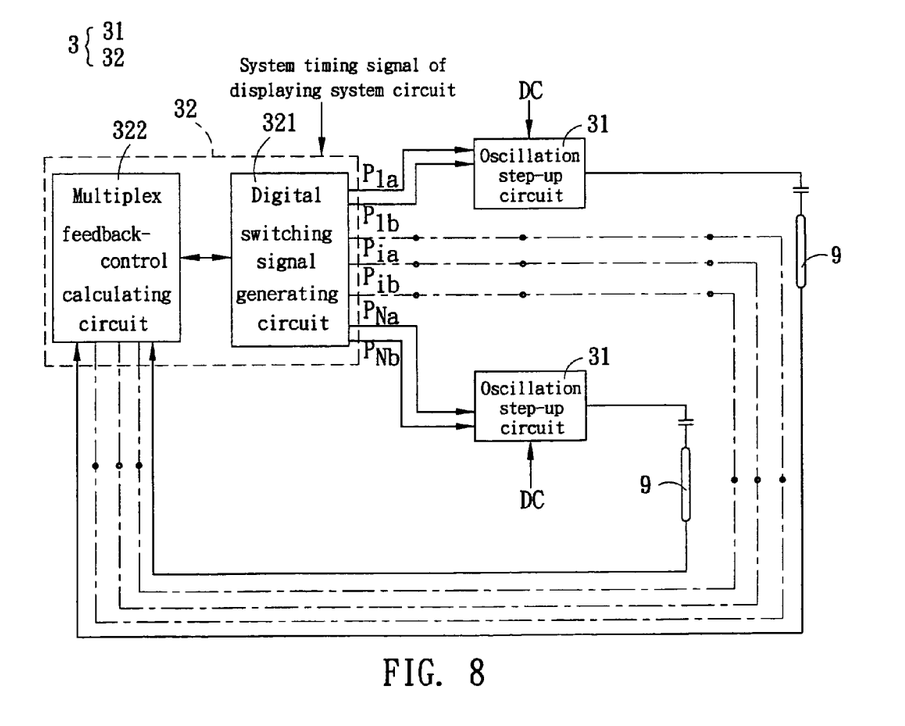
FIG. 8 is a block diagram showing another multi-light driving device of the LCD according to another preferred embodiment of the invention.

When utilizing the method for driving an LCD of the invention to drive the CCFLs 9, the duty cycle of the digital switching signals (Pia and $P_{ib}$) generated by the digital control circuit 32 is adjusted to decrease the brightness of one CCFL 9. With reference to FIG. 7A and FIG. 7B, the duty cycle of the digital switching signals (Pia and $P_{ib}$) is adjusted from that shown in FIG. 7A to that shown in FIG. 7B. Therefore, the brightness of the light-emitting unit $L_i$ can be decreased as shown in FIG. 2. In contrary, when the brightness of the light-emitting unit $L_i$ is to be increased, the duty cycle of the digital switching signals ($P_ia$ and $P_{ib}$) is adjusted from that shown in FIG. 7B to that shown in FIG. 7A. At the meanwhile, the brightness of the light-emitting unit L;+, is decreased according to another set of digital switching signals ($P_i$+I)a and $^P$(I+I)b) Furthermore, as shown in FIG. 8, the digital control circuit 32 may include a digital switching signal generating circuit 321 and a multiplex feedback-control calculating circuit 322.

The digital switching signal generating circuit 321 electrically connects to each of the oscillation step-up circuits 31, and generates sets of digital switching signals (Pia and P;$_b$). Each set of digital switching signals ($P_{ia}$ and P;$_b$) is input to each oscillation step-up circuit 31. The multiplex feedback-control calculating circuit 322 controls the digital switching signal generating circuit 321, and controls the duty cycles of each set of the digital switching signals generated by the digital switching signal generating circuit 321 according to feedback signals from each CCFL 9. In the present embodiment, the feedback signals of each CCFL 9 can be current signals or voltage signals.

As mentioned above, since the LCD of the invention generates sets of digital switching signals using a digital-control method, which are phase controllable and duty cycle controllable, the relative brightness between a plurality of light-emitting units can be easily adjusted. Thus, a dark zone can be generated in the screen of the LCD by the brightness distribution of the light-emitting units. In other words, the LCD of the invention can generate a dark zone that includes a scan line, which is being activated. This can simulate the impulse-type display. Therefore, the image blurring issue existing in the conventional LCD can be prevented. Furthermore, since the brightness changing of the light-emitting units is controlled within a proper range when driving the LCD of the invention, the flicker issue can be prevented. Although the multi-light driving device of the LCD of the invention generates the sets of digital switching signals using a digital-control method, which are phase controllable and duty cycle controllable, in this embodiment, the multi-light driving device may also generate the digital switching signals using an analog-control method.

The LCD and the method for driving the same are described, wherein the multi-light driving device of the invention is illustrated in the above-mentioned embodiments. Thus, an additional embodiment for describing the multi-light driving device is omitted.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed:

1. A multi-light driving device for driving a plurality of light-emitting units and controlling the brightness of the light-emitting units, comprising:

a plurality of oscillation step-up circuits, each of which generates an AC signal for driving each of the light-emitting units and controlling the brightness of each of the light-emitting units; and a digital control circuit, which connects to each of the oscillation step-up circuits, generates sets of digital switching signals, and respectively transmits the sets of the digital switching signals to the oscillation step-up circuits, wherein a phase and a duty cycle of each set of the digital switching signals are controlled by the digital control circuit, and the current level of the AC signal generated by each of the oscillation step-up circuits is adjusted according to the set of the digital switching signals, wherein the digital control circuit comprises:

a digital switching signal generating circuit, which electrically connects to each of the oscillation step-up circuits, and generates the sets of the digital switching signals respectively input to the oscillation step-up circuits; and a multiplex feedback-control calculating circuit, which controls the digital switching signal generating circuit, and controls the duty cycles of the sets of the digital switching signals generated by the digital switching signal generating circuit according to feedback signals from the light-emitting units.

2. The multi-light driving device of claim 1, wherein the digital control circuit adjusts the duty cycle of each set of the digital switching signals according to an external system timing signal output from a displaying system circuit.

3. The multi-light driving device of claim 1, wherein the feedback signals are current signals or voltage signals.

4. A multi-light driving device for driving a plurality of light-emitting units and controlling the brightness of the light-emitting units, comprising:

a plurality of oscillation step-up circuits, each of which generates AC signal for driving each of the light-emitting units and controlling the brightness of each of the light-emitting units; and a digital control circuit, which connects to each of the oscillation step-up circuits, generates sets of digital switching signals, and respectively transmits the sets of the digital switching signals to the oscillation step-up circuits, wherein a phase and a duty cycle of each set of the digital switching signals are controlled by the digital control circuit, and the current level of the AC signal generated by each of the oscillation step-up circuits is adjusted according to the set of the digital switching signals, wherein each of the oscillation step-up circuit comprises a switching unit and a resonance step-up unit, the switching unit electrically connects to the digital control circuit and performs switching according to one corresponding set of the digital switching signals output from the digital control circuit, and the resonance step-up unit is controlled by the switching unit.

5. The multi-light driving device of claim 4, wherein the resonance step-up unit comprises a transformer and a capacitor.

6. The multi-light driving device of claim 5, wherein the switching unit comprises two transistors, the transistors electrically connect to the two ends of the capacitor, respectively, and the transistors are turned on/off according to the corresponding set of the digital switching signals.

* * * * *